United States Patent [19]

Luetzelschwab

[11] Patent Number: 4,661,538

[45] Date of Patent: * Apr. 28, 1987

[54] APPARATUS AND METHOD FOR THE CONTINUOUS PRODUCTION OF AQUEOUS POLYMER SOLUTIONS

[75] Inventor: Wayne E. Luetzelschwab, Littleton, Colo.

[73] Assignee: Marathon Oil Company, Findlay, Ohio

[*] Notice: The portion of the term of this patent subsequent to Apr. 2, 2002 has been disclaimed.

[21] Appl. No.: 742,053

[22] Filed: Jun. 6, 1985

Related U.S. Application Data

[63] Continuation of Ser. No. 618,031, Jun. 7, 1984, abandoned, which is a continuation of Ser. No. 412,006, Aug. 27, 1982, Pat. No. 4,402,916.

[51] Int. Cl.$^4$ ................................. C08K 5/20
[52] U.S. Cl. ........................... 523/348; 524/555; 524/556; 525/327.8; 525/329.4; 525/330.2
[58] Field of Search ............... 525/327.8, 329.4, 330.2; 524/555, 556; 523/348

[56] References Cited

U.S. PATENT DOCUMENTS

| | | | |
|---|---|---|---|
| 4,110,520 | 8/1978 | Miyajima | 525/329.4 |
| 4,110,521 | 8/1978 | Barnett et al. | 526/86 |
| 4,508,858 | 4/1985 | Luetzelschwab | 523/348 |
| 4,576,978 | 3/1986 | Luetzelschwab | 523/348 |

Primary Examiner—Paul R. Michl
Assistant Examiner—Alex H. Walker
Attorney, Agent, or Firm—Jack L. Hummel; Rodney F. Brown

[57] ABSTRACT

Apparatus and method for the continuous preparation of dilute solutions of water soluble polymers, and especially to a closed, on-site arrangement for the continuous production of partially hydrolyzed polyacrylamide solutions for use in the secondary and tertiary recovery of oil from subterranean, oil-bearing reservoirs. The apparatus, in its preferred form, comprises an in-line system which includes a polymerization reactor, a hydrolysis reactor and a diluter. The dimensions of the reactors are such that the reactions taking place therein will go to completion as the reaction mixtures move from the inlet to the outlet of the reactors. Drag means advantageously are positioned in the reactors to control the flow rate of the reaction mixtures and to promote intermixing of the reactants. The diluter of the system incorporates a plurality of polymer dispersing stations which act to progressively increase the water absorbing surface area of the polymer as the polymer solution passes through each station. The diluted end product is characterized by its ability to meet the performance demands of substantially any oil-bearing formation.

9 Claims, 5 Drawing Figures

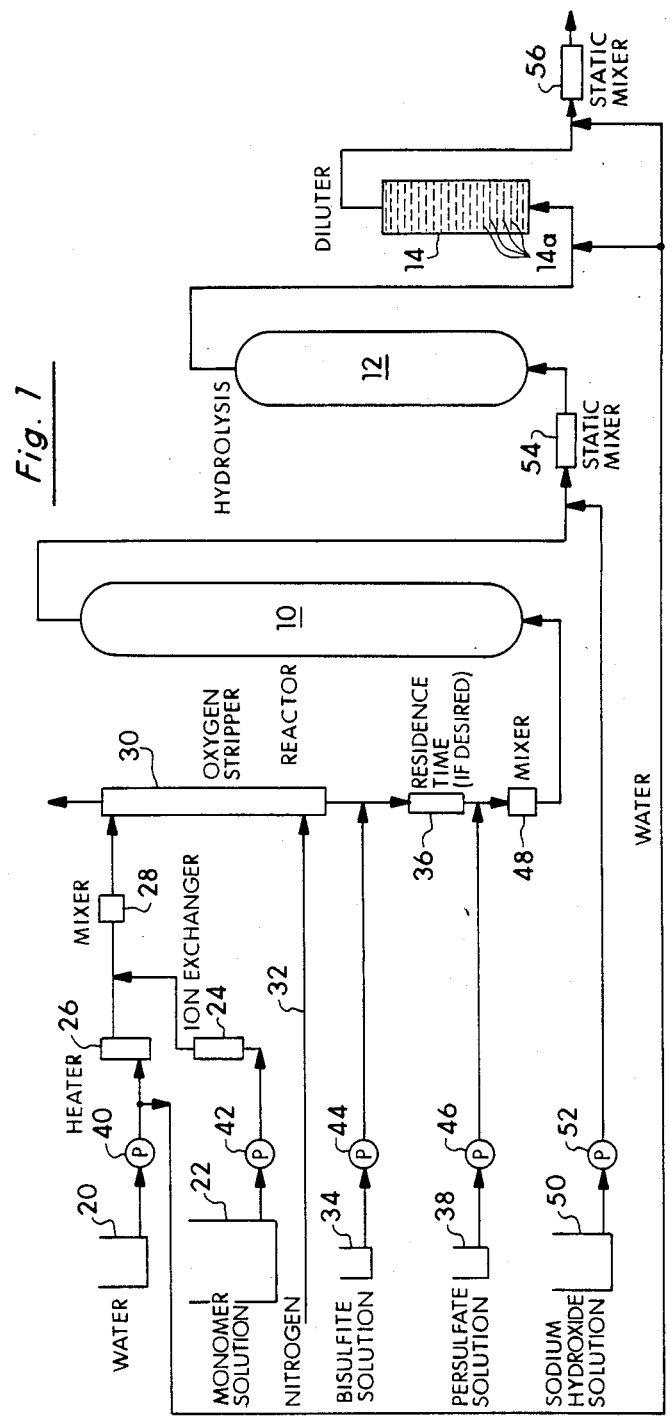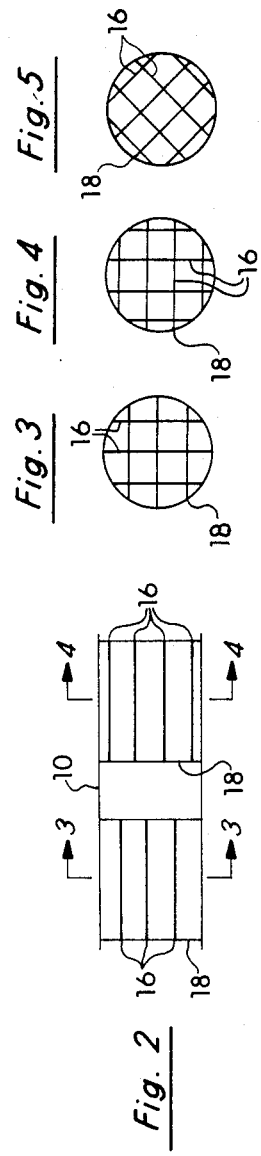

000

APPARATUS AND METHOD FOR THE CONTINUOUS PRODUCTION OF AQUEOUS POLYMER SOLUTIONS

This is a continuation of patent application Ser. No. 618,031, filed June 7, 1984, now abandoned which is a continuation of parent application Ser. No. 412,006, filed Aug. 27, 1982 now U.S. Pat. No. 4,402,916.

TECHNICAL FIELD

This invention relates to apparatus, and to a method, for the production of aqueous polymer solutions, and especially to apparatus and to a method for the on-site, continuous production of such solutions for use in the secondary and tertiary recovery of oil from subterranean, oil-bearing formations.

BACKGROUND OF PRIOR ART

Apparatus and methods for the continuous polymerization of water soluble polymers are the subject matter of a number of U.S. patents. Thus, U.S. Pat. No. 2,820,777 discloses a continuous process for polymerizing and hydrolyzing acrylamide. The patent contains no teaching with regard to apparatus for carrying out the process. U.S. Pat. No. 3,732,193 discloses a continuous polymerization process in which an aqueous solution of a water soluble unsaturated monomer such as acrylamide is polymerized on a heated, continuously moving belt to produce a polymer in a dry, thin film form. In U.S. Pat. No. 4,110,521 there is disclosed apparatus for the continuous polymerization of water soluble polymers. The apparatus comprises a jacketed, tubular reactor which contains static mixers, a jacketed post reactor, also containing static mixers, and a diluter containing static mixers for mixing the polymer and water feeds. A jacketed tank is provided for retaining reactants to be added to the post reactor. According to the patent, the end product from the diluter can go to bulk storage or it may be used directly.

The apparatus disclosed in U.S. Pat. No. 3,732,193 would, for all practical purposes, be useless for the on-site preparation of aqueous polymer solutions of the type employed in the secondary and tertiary recovery of oil from subterranean oil-bearing formations. The apparatus shown in U.S. Pat. No. 4,110,521, while having obvious advantages over the apparatus of U.S. Pat. No. 3,732,193 for the preparation of aqueous polymer solutions for use in secondary and tertiary oil recovery operations, has a number of shortcomings which detract from its adaptation for the on-site preparation of such solutions. More specifically in this connection, the apparatus of the patent is characterized by its extensive use of static mixers. Static mixers are costly and their use on the scale contemplated in the patent would make the apparatus prohibitively expensive. In addition, the apparatus of the patent requires the use of temperature control jackets not only on the reactors, but, also, on each of the tanks or vessels used for the reactants. The use of cooling or heating jackets of the size and type contemplated in the patent further adds to the complexity and to the cost of the apparatus. Yet another significant shortcoming of the apparatus of the patent, and one to which no reference is made in the patent, concerns the properties of the polymer solutions prepared with the apparatus. Thus, while the patent has for one of its objects the provision of apparatus in which the reaction conditions are controlled to produce polymers of uniform molecular weight and molecular weight distribution, it does not disclose means for preparing polymer solutions in a manner to prevent, or reduce to minimum levels, degradation of the polymer comprising the solutions. Degradation, or thinning, of the polymer adversely affects the injectivity and mobility properties of the polymer solution thereby lessening to an appreciable degree its ability to satisfy the performance demands of an oil-bearing formation.

BRIEF SUMMARY OF THE INVENTION

The apparatus, and method, of the present invention are uniquely adapted for the on-site, continuous preparation of aqueous polymer solutions, especially aqueous partially hydrolyzed polyacrylamide solutions for use as drive fluids and/or mobility buffers in the secondary or tertiary recovery of oil from subterranean oil-bearing formations or reservoirs. The apparatus is inexpensive to build, and easy to install and operate. What is more, it enables the formation of the polymer solutions to be closely controlled at all stages in their preparation to provide an end product having predictable properties from the standpoint of its ability to meet the performance demands of substantially any oil-bearing formation or reservoir. The apparatus of this invention is further characterized in that no pumps are required to handle concentrated polymer solutions, and in that, where employed, the pumps are advantageously located only on the inlet feed stream side of the apparatus.

The apparatus, in a preferred embodiment of the invention, comprises a polymerization reactor, a hydrolysis reactor and a diluter. The polymerization and hydrolysis reactors each desirably take the form of an elongated tube or pipe having a length and cross-sectional area such that the residence time of the reaction mixture in the tube or pipe, at a predetermined rate of flow, will be sufficient to enable the reaction taking place in the tube or pipe to go to completion. The dimensions of the reactors advantageously can be proportioned to optimum size by incorporating fluid flow control or retarding means in the reactors to reduce the rate of flow of the reaction mixtures in a manner to assure completion of the desired reactions. The diluter employed in the apparatus is characterized in that it is capable of achieving dilution of a polymer solution, such as a partially hydrolyzed polyacrylamide solution, to a predetermined concentration without any adverse affect on the integrity of the polymer comprising the solution.

The foregoing, and other features and advantages of the invention will become more apparent from the description to follow, taken in conjunction with the accompanying drawing.

BRIEF DESCRIPTION OF THE DRAWINGS

FIG. 1 is a schematic view of an embodiment of the apparatus of the present invention;

FIG. 2 is a schematic sectional view showing embodiments of fluid flow control or retarding means arranged in a reactor; and FIGS. 3, 4 and 5 are schematic sectional views at a right angle to the view of FIG. 2.

DETAILED DESCRIPTION OF THE INVENTION

The embodiment of the apparatus shown in FIG. 1 comprises a polymerization reactor 10, a hydrolysis reactor 12 and a diluter 14. The reactors 10 and 12, and the diluter 14 desirably are fabricated of stainless steel tubing or piping, and each is provided with an inlet and an outlet. The ends of the reactors 10 and 12 advantageously are rounded or cupped to improve the flow pattern of the fluids entering and exiting the reactors. The dimensions of the reactors 10 and 12, and the diluter 14 are variable, and will be determined, in the case of the reactors 10 and 12, by the residence time, at a preselected flow rate, required to complete the reaction taking place in the reactors, and, in the case of the diluter 14, by the residence time, at a preselected flow rate, to provide a polymer solution of a desired concentration. Thus, by way of illustration, in utilizing the apparatus of this invention for the continuous preparation of a dilute aqueous solution of a partially hydrolyzed polyacrylamide, the polymerization reactor 10 advantageously will have a length to diameter ratio of the order of from about 6:1 to about 10:1, while the hydrolysis reactor 12 preferably will have a length to diameter ratio ranging from about 4:1 to about 6:1. The diluter 14, on the other hand, can have a length to diameter ratio of from about 30:1 to about 10:1.

As indicated above, the dimensions, in particular, the volume of the reactors 10 and 12 can be reduced to optimum capacity by providing flow control or retarding means within the reactors. Such means may comprise screens positioned substantially perpendicular to the flow of fluids in the reactors; plates parallel to flow; plates in the form of a grid parallel to flow; or rods parallel to flow. In FIGS. 2 through 5 of the drawings, an arrangement comprising a plurality of plates 16 in the form of a grid 18 is shown in the reactor 10. More than one grid may be employed as shown, and the grids may be spaced from one another, and each grid may be oriented at a different angle with relation to the other grids in the reactor. By thus spacing the grids, and rotating them so that the plates of each grid lie in different planes with relation to the plates of the other grids, a more even, overall flow pattern is obtained. In those instances where control of the temperature of the reaction mixture in the reactors is desired, coils for either heating or cooling the reaction mixture may be incorporated in the reactors in place of drag producing means such as rods parallel to the flow of fluid in the reactors.

The diluter 14 of the apparatus illustrated in FIG. 1 desirably is provided internally with a plurality of polymer solution dispersing stations 14a. The stations may comprise perforated plates or screens, or a combination of perforated plates and screens. A unit suitable for use as the diluter 14 is described in my copending U.S. Pat. application Ser. No. 279,027, filed: June 30, 1981, entitled: Dilution Apparatus and Method, now U.S. Pat. No. 4,402,916 dated Sept. 6, 1983. The diluter 14 is unique in that it is capable of achieving the dilution of polymer solutions such as aqueous solutions of partially hydrolyzed polyacrylamide without any concomitant degradation or thinning of the polymer thereby enabling the preparation of an end product having the injectivity and mobility properties necessary to meet the performance demands of an oil bearing formation or reservoir.

Referring, now, in greater detail to FIG. 1 of the drawing, the apparatus as shown is especially suited for the on-site, continuous preparation of polymer solutions for use in the secondary or tertiary recovery of oil. To this end, there is located upstream of the reactors 10 and 12 tanks and auxiliary equipment necessary for the preparation of a polymer solution suitable for injection into an input well of an oil-bearing formation or reservoir. As shown, a water tank 20, connected to a source of water, and a storage tank 22 for holding a supply of an aqueous solution of a monomer such as acrylamide, are provided. Prior to entraining the monomer solution from the tank 22 in the water stream, the monomer solution may be passed through an ion exchanger 24 to remove metallic ions such as copper which may interfere with the polymerization reaction. The water stream, itself, may be passed through a heater 26 to raise the temperature of the water sufficiently to facilitate initiation of the polymerization reaction. After the monomer solution is entrained in the water stream from the water source, it desirably is passed through a static mixer 28 to achieve thorough distribution of the monomer solution in the reaction mixture. From the mixer 28, the aqueous monomer solution is passed to an oxygen stripper 30. The oxygen stripper is in communication with a source of nitrogen gas 32. Nitrogen gas is bubbled through the monomer solution in the stripper 30 to remove dissolved oxygen from the solution.

As illustrated, a first catalyst from a tank 34 is added to the monomer solution as it exits from the stripper 30. The catalyst may be selected from any of a number of organic and inorganic compounds employed in the polymerization of monomers. Mixtures of such catalysts may be employed, and may be added separately, as shown in FIG. 1, to the monomer solution. The monomer solution, in the presence of the first catalyst, may, if desired, be held in a small tank or large diameter pipe 36 for a short period. The monomer-catalyst solution is then discharged from the tank 36, and a second catalyst from a tank 38 is added. In the embodiment of the apparatus illustrated pumps 40, 42, 44 and 46 are associated with the water tank 20, the monomer storage tank 22, and the catalysts tanks 34 and 38, respectively. After addition of the second catalyst, the monomer solution, together with the catalysts, may then be passed through a static mixer 48, and into the polymerization reactor 10.

The residence time of the reaction mixture in the reactor 10 can range from about 7 to about 10 hours, after which the resulting polymer solution is discharged from the reactor 10 and conveyed to a point where a hydrolyzing agent from a storage tank 50 is incorporated by means of a pump 52 into the polymer solution. The thusly formed reaction mixture is then advantageously passed through a static mixer 54 from where it is conveyed to the hydrolysis reactor 12.

The residence time of the reaction mixture in the reactor 12 can range from about 4 to about 6 hours, after which the hydrolyzed polymer solution is conveyed to the diluter 14. Water from the source is fed into the diluter 14 along with the hydrolyzed polymer solution from the reactor 12. The diluted solution exits from the diluter, and is conveyed to a static mixer 56 where additional water from the source is introduced. The diluted solution exiting from the mixer 56 can be conveyed directly to an input well, for example, or it can be conveyed to a storage area where it may be further diluted prior to use.

In order to illustrate the specific utility of the apparatus for preparing a dilute aqueous solution of a partially hydrolyzed polyacrylamide, a monomer solution comprising 50%. by weight, acrylamide is passed through an ion exchanger at a rate of about 0.7 lb./min. to remove any copper ion present in the solution. The solution is then introduced into a stream of water preheated to a temperature of about 110° F. The heated solution is passed through a static mixer and then through an oxygen stripper where it is purged of any dissolved oxygen with nitrogen gas. As the purged solution leaves the stripper, a 25% by weight aqueous solution of sodium bisulfite is metered into the solution at a rate of about 0.00025 lb./min. The catalyzed solution is then conveyed to a small (6 gal.) residence tank where it remains for about 15 minutes. As the solution exits the residence tank, a second catalyst solution comprising a 25% by weight aqueous ammonium persulfate solution, is metered into the monomer solution at a rate of about 0.0005 lb./min. The monomer-catalysts solution is then passed through a static mixer and fed, at a rate of about 5.7 lbs./min., at a temperature of 105° F., and under a pressure of 100 psig, into a polymerization reactor. The reactor is about 16 feet long and 2 feet in diameter, and has a capacity of approximately 375 gallons. Polymerization of the monomer in the reactor proceeds over a period of about 9 hours. The polymer solution undergoes an increase in temperature in the reactor to a level of about 135° F. The resulting 6% by weight polyacrylamide solution formed in the reactor exits the reactor at a rate of about 5.7 lb./min., under a pressure of about 90 psig. A 50% by weight aqueous solution of sodium hydroxide is metered by a pump into the polymer solution at a rate of about 0.11 lb./min., and a pressure of 90 psig. The temperature of the hydroxide solution is approximately 75° F. The polymercaustic solution is first passed through a static mixer and then into a hydrolysis reactor. The reactor is approximately 10 feet long and 2 feet in diameter, and has a capacity of approximately 235 gallons.

Hydrolysis of the polymer in the reactor is allowed to proceed over a period of about 6 hours. The percent hydrolysis of the polyacrylamide is approximately 30%. The concentration of the partially hydrolyzed polyacrylamide in the solution is about 6.6% by weight. The hydrolyzed polymer solution has a temperature of about 135° F. The solution is then conveyed at the rate of about 5.79 lb./min., at a pressure of about 60 psig to a sequential screen diluter comprising a tube about 4 inches in diameter and about 10 feet in length. The diluter desirably has six polymer dispersing stations, each comprising screens having a different mesh size, the mesh size of the screens progressively decreasing from the inlet end of the diluter to the outlet end thereof. Water at a temperature of about 70° F. is fed at a rate of about 32.4 lb./min., under a pressure of 75 psig, into the diluter simultaneously with the hydrolyzed polymer solution. The solution is diluted down in the diluter to provide a solution comprising about 1% by weight of a partially hydrolyzed polyacrylamide. The residence time of the solution in the diluter is about 2 minutes. The 1% solution is conveyed from the diluter at a rate of about 38 lb./min. under a pressure of about 20 psig, and a temperature of about 80° F., to a point where additional water, at a temperature of about 70° F., is fed into the solution at a rate of about 295 lb./min., under a pressure of about 35 psig. The solution, with the added water, is then passed through a static mixer to provide a 0.1% solution of the partially hydrolyzed polyacrylamide. The diluted solution is ready for injection into an input well as a mobility control buffer, or as a drive fluid.

While the apparatus and method of the present invention have been described and illustrated with relation to their specific use in the preparation of partially hydrolyzed polyacrylamide solutions, it should be understood that such description and showing have been given by way of illustration and example, and not by way of limitation, and that the apparatus and method may be adapted for use in the preparation of other polymer solutions.

I claim:

1. A method for the continuous, on-site production of dilute aqueous solutions of water soluble partially hydrolyzed polyacrylamides for injection into an input well of a subterranean, oil-bearing formation, comprising: providing, in a closed, in-line system located at an oil-bearing formation having at least one input well and an output well, a polymer forming aqueous reaction mixture consisting essentially of at least one water-soluble polymerizable acrylamide and at least one polymerization catalyst in an amount sufficient to substantially completely polymerize the acrylamide; passing the aqueous reaction mixture at a predetermined flow rate into first reactor means; regulating the flow rate and the flow pattern of the aqueous reaction mixture in the first reactor means thereby to maintain it therein under conditions such as to effect substantially complete polymerization of the acrylamide monomer in the aqueous reaction mixture to provide a dilute aqueous solution of polyacrylamide; passing the dilute aqueous polyacrylamide solution formed in the first reactor means at a predetermined flow rate from said first reactor means to a second reactor means; introducing an alkali metal hydroxide hydrolyzing agent into the aqueous polymer solution as it is passed from the first reactor means and before it enters the second reactor means to form a second reaction mixture; regulating the flow rate and the flow pattern of said second reaction mixture in the second reactor means to maintain it therein for a time sufficient to effect partial hydrolysis of the polyacrylamide in the dilute aqueous solution from the first reactor means; passing the aqueous partially hydrolyzed polyacrylamide solution from the second reactor means to sequential screen diluter means provided with a plurality of dispersing stations comprising screens having a different mesh size; moving the aqueous partially hydrolyzed polyacrylamide solution at a predetermined flow rate and flow pattern sequentially through each of the dispersing stations of the diluter means to effect dilution of the aqueous partially hydrolyzed polyacrylamide solution, said dilution of the aqueous partially hydrolyzed polyacrylamide solution being carried out in a matter of minutes in a manner to prevent, or reduce to minimum levels, degradation or thinning of the partially hydrolyzed polyacrylamide; further diluting the aqueous partially hydrolyzed polyacrylamide solution formed in the diluter means before injecting it into an input well of the oil-bearing formation; and injecting said further diluted solution into said at least one input well of the oil-bearing formation.

2. A method according to claim 1 wherein the hydrolyzing agent is about a 50% aqueous solution of sodium hydroxide.

3. A method according to claim 1 wherein sufficient hydrolyzing agent is introduced to effect about 25% to about 45% hydrolysis of the polyacrylamide.

4. A method according to claim 1 wherein the polymer forming reaction mixture is passed through a mixer before it enters the first reactor means, and the polymer solution from the first reactor means and the hydrolyzing agent are passed through a mixer downstream from the point at which said agent is introduced.

5. A method according to claim 1 wherein the residence time of the polymer forming reaction mixture in the first reactor means is about 7 to about 12 hours.

6. A method according to claim 1 wherein the concentration of the polymer formed in the first reactor means is about 6%.

7. A method according to claim 1 wherein the residence time of the second reaction mixture in the second reactor means is about 4 to about 6 hours.

8. A method according to claim 1 wherein the flow rate of the aqueous partially hydrolyzed polyacrylamide solution in said diluter is such that dilution to a concentration of about 1% by weight is attained in a few minutes.

9. A method according to claim 1 wherein the solution from the diluter means is further diluted to provide an aqueous solution comprising about 0.1% by weight of partially hydrolyzed polyacrylamide.

* * * * *